United States Patent
Yoshimitsu et al.

(10) Patent No.: US 10,897,209 B2
(45) Date of Patent: Jan. 19, 2021

(54) POWER SUPPLY DEVICE WITH A CONTROLLER THAT CONTROLS A FIRST SWITCHING ELEMENT AND A SECOND SWITCHING ELEMENT

(71) Applicant: Yazaki Corporation, Tokyo (JP)

(72) Inventors: Shota Yoshimitsu, Shizuoka (JP); Keisuke Kanda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/599,104

(22) Filed: Oct. 10, 2019

(65) Prior Publication Data
US 2020/0153350 A1 May 14, 2020

(30) Foreign Application Priority Data
Nov. 14, 2018 (JP) .................... 2018-213417

(51) Int. Cl.
*H02M 3/335* (2006.01)
*H02M 1/08* (2006.01)
*H02M 1/34* (2007.01)

(52) U.S. Cl.
CPC ......... *H02M 3/33576* (2013.01); *H02M 1/08* (2013.01); *H02M 1/34* (2013.01); *H02M 2001/342* (2013.01)

(58) Field of Classification Search
CPC ............ H02M 3/22; H02M 1/08; H02M 1/36; H02M 3/24; H02M 3/325; H02M 3/335; H02M 3/33576
See application file for complete search history.

(56) References Cited

U.S. PATENT DOCUMENTS 6,498,734 B1 * 12/2002 Nishide ............ H02M 3/33561
363/21.04
2013/0301304 A1 11/2013 Murakami et al.
(Continued)

FOREIGN PATENT DOCUMENTS

| JP | 2001-211644 A | 8/2001 |
| JP | 2006-67703 A | 3/2006 |
| JP | 2014-166026 A | 9/2014 |

*Primary Examiner* — Adolf D Berhane
*Assistant Examiner* — Afework S Demisse
(74) *Attorney, Agent, or Firm* — Kenealy Vaidya LLP

(57) ABSTRACT

In the power supply device, the insulated transformer transforms the voltage of alternating-current power. The rectifying circuit rectifies the alternating-current power transformed by the transformer to direct-current power. The smoothing inductor smoothes the direct-current power rectified by the rectifying circuit. The first output terminal outputs the direct-current power smoothed by the smoothing inductor. The second output terminal is a terminal different from the first output terminal and outputs the direct-current power smoothed by the smoothing inductor. An FET is provided between the smoothing inductor and the first output terminal and adjusts a current output from the smoothing inductor to the first output terminal. An FET is provided between the smoothing inductor and the second output terminal and adjusts a current output from the smoothing inductor to the second output terminal. The controller controls the FET and the FET.

6 Claims, 9 Drawing Sheets

(56) References Cited

U.S. PATENT DOCUMENTS

2014/0268892 A1\* 9/2014 Zhou .................. H02M 3/33592
                                                363/17
2014/0347891 A1   11/2014 Muto
2017/0063251 A1\* 3/2017 Ye ..................... H02M 3/33576

\* cited by examiner

POWER SUPPLY DEVICE WITH A CONTROLLER THAT CONTROLS A FIRST SWITCHING ELEMENT AND A SECOND SWITCHING ELEMENT

CROSS-REFERENCE TO RELATED APPLICATION(S)

The present application claims priority to and incorporates by reference the entire contents of Japanese Patent Application No. 2018-213417 filed in Japan on Nov. 14, 2018.

BACKGROUND OF THE INVENTION

1. Field of the Invention

The present invention relates to power supply devices.

2. Description of the Related Art

Conventional power supply devices include, for example, multi-output power supply devices. Such a multi-output power supply device includes an insulated DC/DC converter that transforms a direct-current voltage of a high-voltage power supply and a step-down chopper circuit that steps down the DC voltage transformed by the DC/DC converter. Japanese Patent Application Laid-open No. 2006-67703 discloses a switching power supply device that includes a main converter and a sub-converter. The main converter transforms a direct-current voltage, and the sub-converter transforms the direct-current voltage to a voltage that is less than that from the main converter.

The multi-output power supply device described above still has room for improvement in that, for example, a plurality of different power supplies are configured from a high-voltage power supply.

SUMMARY OF THE INVENTION

In view of the above, the object of the present invention is to provide a power supply device in which the power supplies can be properly configured from the high-voltage power supply.

In order to solve the above mentioned problem and achieve the object, a power supply device according to one aspect of the present invention includes an insulated transformer that transforms a voltage of alternating-current power; a rectifying circuit that rectifies the alternating-current power transformed by the transformer to direct-current power; a smoothing inductor that smoothes the direct-current power rectified by the rectifying circuit; a first output terminal that outputs the direct-current power smoothed by the smoothing inductor; a second output terminal that is a terminal different from the first output terminal and outputs the direct-current power smoothed by the smoothing inductor; a first switching element that is provided between the smoothing inductor and the first output terminal and adjusts a current output from the smoothing inductor to the first output terminal; a second switching element that is provided between the smoothing inductor and the second output terminal and adjusts a current output from the smoothing inductor to the second output terminal; and a controller that controls the first switching element and the second switching element.

According to another aspect of the present invention, in the power supply device, it is preferable that the power supply device further includes a switching circuit that outputs, to the transformer, alternating-current power obtained by transforming direct-current power supplied from a power supply, wherein the controller controls the switching circuit based on a first feedback-control amount corresponding to a difference between an output value output from the first output terminal and a first target voltage to be targeted with a difference between an output value output from the second output terminal and a second target voltage to be targeted.

According to still another aspect of the present invention, in the power supply device, it is preferable that the controller controls the first switching element by using a rectangular first pulse signal generated based on a second feedback-control amount corresponding to a difference between an output value output from any one of the first output terminal and the second output terminal and a target value to be targeted, and controls the second switching element by using a second pulse signal obtained by reversing the first pulse signal.

According to still another aspect of the present invention, in the power supply device, it is preferable that a snubber circuit that includes a storage element storing surge power due to reverse recovery time of the rectifying circuit, a third switching element discharging the surge power stored in the storage element, and a snubber inductor provided between the third switching element and the second output terminal; and a fourth switching element that is provided between the first output terminal and the third switching element and energizes or de-energizes a current flowing between the first output terminal and the third switching element, wherein the snubber inductor, the third switching element, and the fourth switching element configures a step-down chopper circuit that steps down a voltage of power supplied from the first output terminal to output the stepped-down voltage to the second output terminal, and a step-up chopper circuit that steps up a voltage of power supplied from the second output terminal to output the stepped-up voltage to the first output terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention (embodiments) will be described in detail with reference to the drawings. The present invention is not limited by the description of the following embodiments. The components described below include one that is readily conceived by those skilled in the art and one that is substantially the same as those. Furthermore, the configurations described below can be combined as necessary. Various omissions, substitutions, or changes of the configurations can be conducted without departing from the subject matter of the present invention.

First Embodiment

Figure 1:
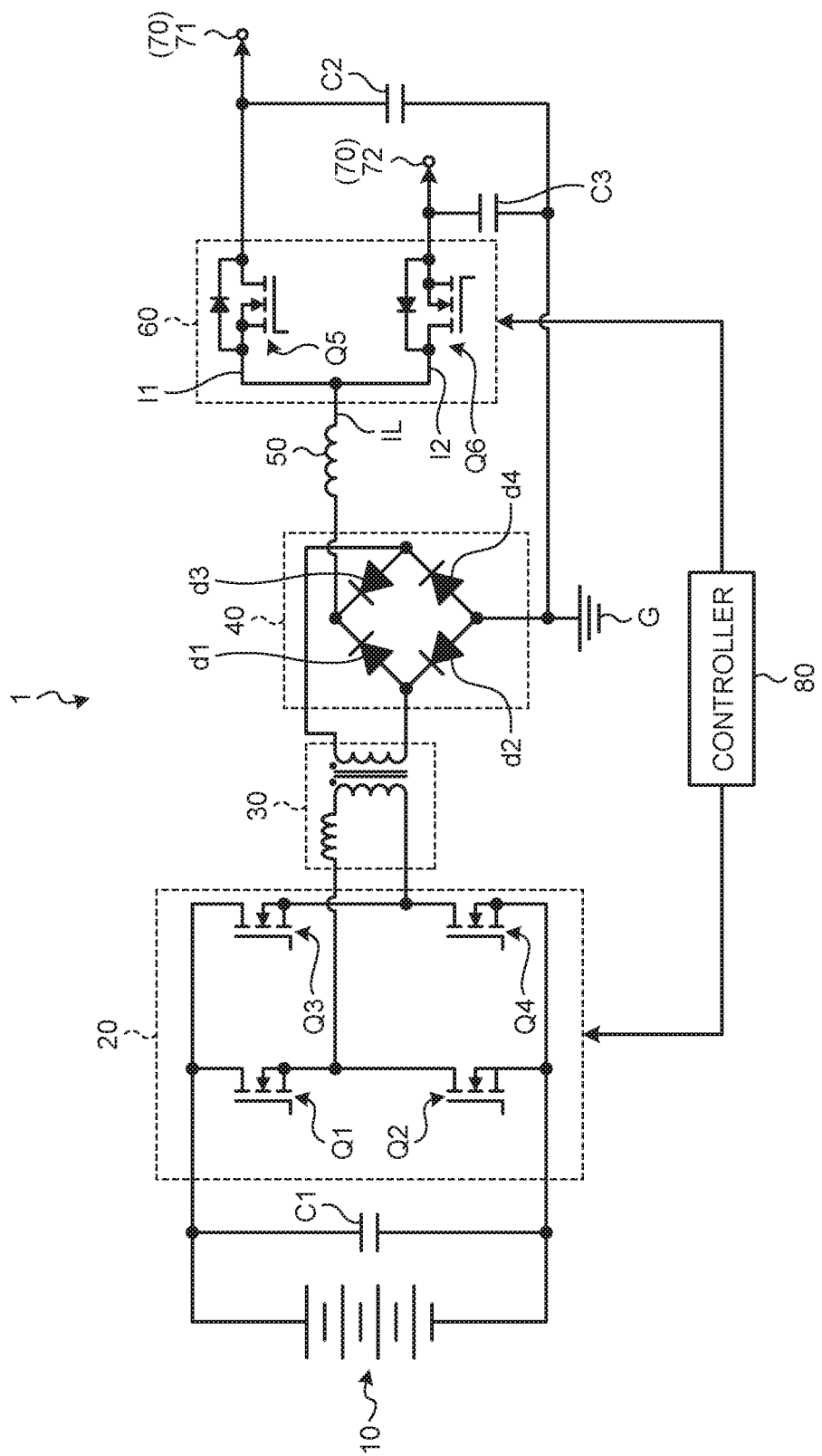
FIG. 1 is a circuit diagram illustrating a configuration example of a multi-output power supply device according to a first embodiment.
Figure 2:
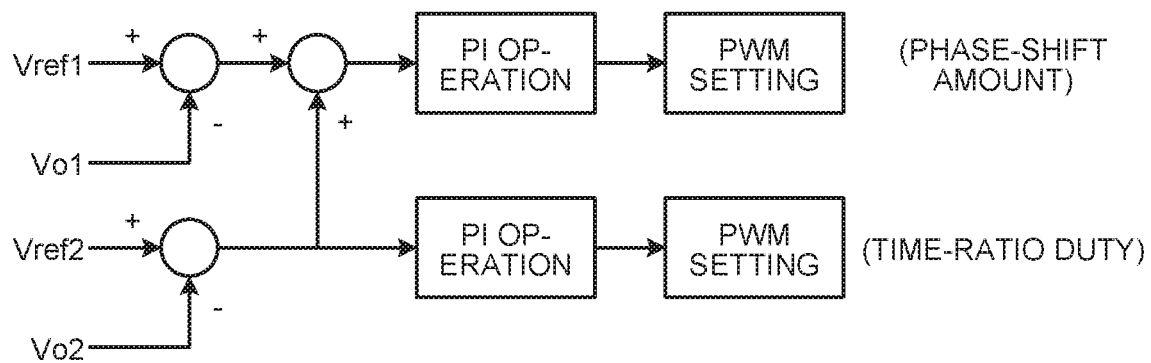
FIG. 2 is a diagram illustrating a calculation example of a phase-shift amount and a duty according to the first embodiment.
Figure 3:
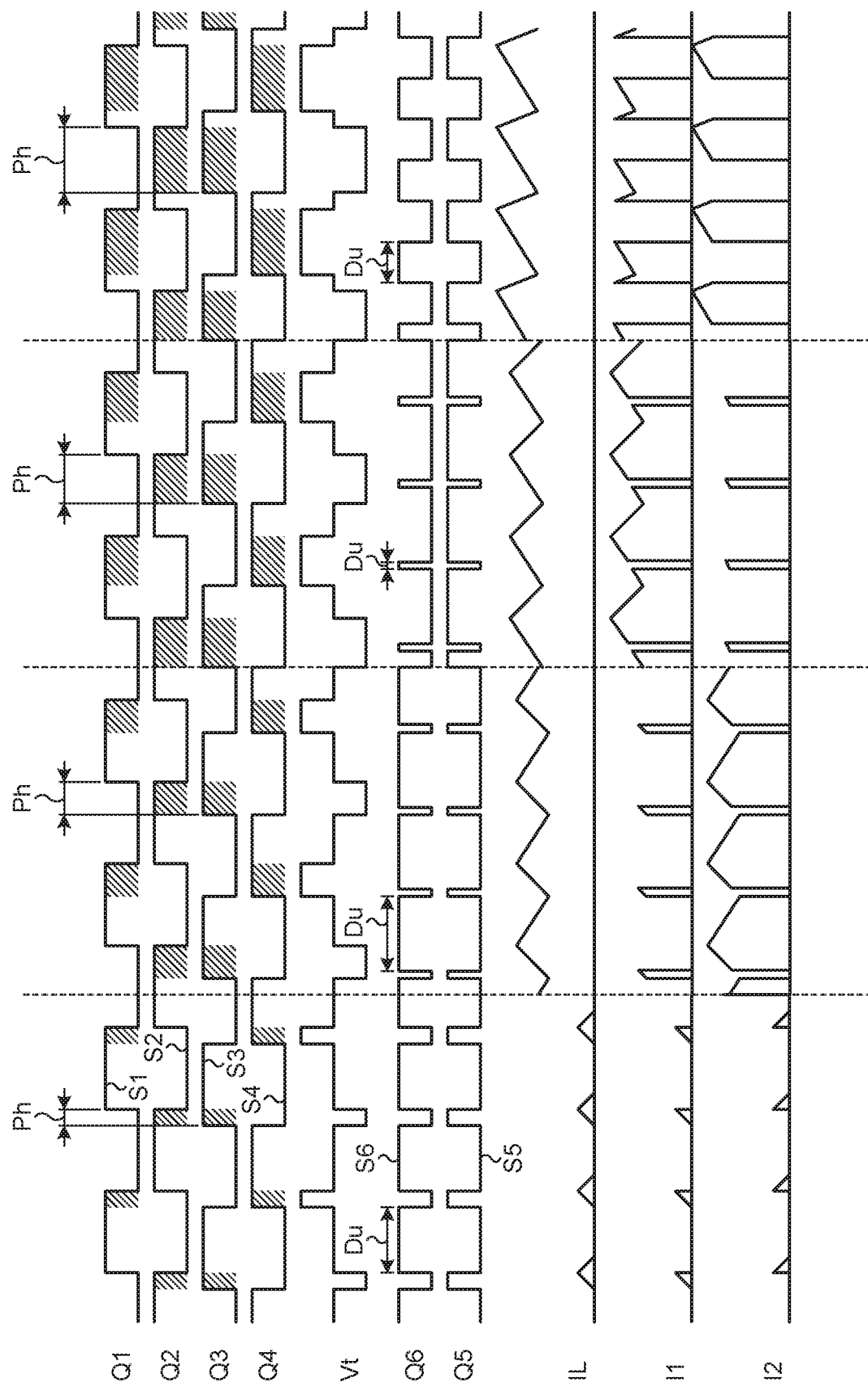
FIG. 3 is a sequence diagram illustrating an operation example of the multi-output power-supply device according the first embodiment.

A multi-output power supply device 1 according to a first embodiment will be described with reference to the drawings. FIG. 1 is a circuit diagram illustrating a configuration example of the multi-output power supply device 1 according to the first embodiment. FIG. 2 is a diagram illustrating a calculation example of a phase-shift amount Ph and a duty Du according to the first embodiment. FIG. 3 is a sequence diagram illustrating an operation example of the multi-output power supply device 1 according the first embodiment.

The multi-output power supply device 1 configures a plurality of different power supplies from a high-voltage power supply 10. As shown in FIG. 1, the multi-output power supply device 1 includes a power supply 10, a full-bridge circuit 20 as a switching circuit, a transformer 30 as a voltage converter, a rectifying circuit 40, a smoothing inductor 50, a switching unit 60, an output unit 70, and controller 80.

The power supply 10 supplies direct-current power. For example, the power supply 10 is configured with a plurality of battery cells connected in series. The power supply 10 supplies a relatively-high voltage to be insulated.

The full-bridge circuit 20 converts direct-current power into alternating-current power. The full-bridge circuit 20 is a phase-shifted switching circuit and includes four switching elements. The full-bridge circuit 20 includes, for example, a field-effect transistor (FET) Q1, an FET Q2, an FET Q3, and an FET Q4. For example, the FETs Q1 to Q4 are N-channel metal-oxide-semiconductor (MOS) FETs.

The full-bridge circuit 20 is formed as a first series circuit in which the source terminal of the FET Q1 is coupled to the drain terminal of the FET Q2. The first series circuit, where the drain terminal of the FET Q1 is coupled to the positive electrode of the power supply 10 and the source terminal of the FET Q2 is coupled to the negative electrode of the power supply 10, is coupled between the positive electrode and the negative electrode of the power supply 10.

The full-bridge circuit 20 is formed as a second series circuit in which the source terminal of the FET Q3 is coupled to the drain terminal of the FET Q4. The second series circuit, where the drain terminal of the FET Q3 is coupled to the positive electrode of the power supply 10 and the source terminal of the FET Q4 is coupled to the negative electrode of the power supply 10, is coupled between the positive electrode and the negative electrode of the power supply 10. The second series circuit, where the drain terminal of the FET Q3 is coupled to the drain terminal of the FET Q1 and the source terminal of the FET Q4 is coupled to the source terminal of the FET Q2, is coupled to the first series circuit in parallel.

The full-bridge circuit 20 is coupled to the controller 80, and the FETs Q1 to Q4 are pulse width modulation (PWM) controlled by the controller 80. The full-bridge circuit 20 converts direct-current power supplied from the power supply 10 into alternating-current power by using the FETs Q1 to Q4 and outputs the alternating-current power to a primary winding of the transformer 30. Note that an input capacitor C1 for smoothing is provided between the full-bridge circuit 20 and the power supply 10.

The transformer 30 transforms the voltage of the alternating-current power. The transformer 30 includes the primary winding and a secondary winding. The primary winding and the secondary winding are magnetically coupled with each other in a manner insulated from each other. The primary winding is coupled to the full-bridge circuit 20. For example, one end of the primary winding is coupled to a connecting wire between the source terminal of the FET Q1 and the drain terminal of the FET Q2, and the other end thereof is coupled to a connecting line between the source terminal of the FET Q3 and the drain terminal of the FET Q4.

The secondary winding is coupled to the rectifying circuit 40. For example, one end of the secondary winding is coupled to a connecting wire between the anode terminal of a diode d3 and the cathode terminal of a diode d4 as described below, and the other end thereof is coupled to a connecting line between the anode terminal of a diode d1 and the cathode terminal of a diode d2. The transformation degree of the transformer 30 is determined depending on the turn ratio (transformation ratio) of the primary winding and the secondary winding. Transformer 30 steps down the alternating-current power supplied from the full-bridge circuit 20 to output it to the rectifying circuit 40.

The rectifying circuit 40 rectifies alternating-current power to direct-current power. The rectifying circuit 40 includes four rectifying elements. The rectifying circuit 40 includes, for example, the diode d1, the diode d2, the diode d3, and the diode d4. The rectifying circuit 40 is configured as a bridge circuit with the diodes d1 to d4 and performs full-wave rectification. In the rectifying circuit 40, the anode terminal of the diode d1 is coupled to the cathode terminal of the diode d2, and the anode terminal of the diode d3 is coupled to the cathode terminal of the diode d4. In the rectifying circuit 40, the cathode terminal of the diode d1 is coupled to the cathode terminal of the diode d3, and the anode terminal of the diode d2 is coupled to the anode terminal of the diode d4.

As described above, one end of the secondary winding is coupled to the connecting wire between the anode terminal of the diode d3 and the cathode terminal of the diode d4 in the rectifying circuit 40. The other end of the secondary winding is coupled to the connecting wire between the anode terminal of the diode d1 and the cathode terminal of the diode d2 in the rectifying circuit 40. The smoothing inductor 50 is coupled to a connecting wire between the cathode terminal of the diode d1 and the cathode terminal of the diode d3 in the rectifying circuit 40. A grand G is coupled to a connecting line between the anode terminal of the diode d2 and the anode terminal of the diode d4 in the rectifying circuit 40. The rectifying circuit 40 rectifies the alternating-current power stepped down by the transformer 30 to direct-current power and outputs the direct-current power to the output unit 70 via the smoothing inductor 50 and the switching unit 60.

The smoothing inductor 50 smoothes direct current (pulsating current). The smoothing inductor 50 is provided between the rectifying circuit 40 and the switching unit 60. One end of the smoothing inductor 50 is coupled to the connecting wire between the cathode terminal of the diode d1 and the cathode terminal of the diode d3, and the other end thereof is coupled to the switching unit 60. The smoothing inductor 50 smoothes the direct-current power rectified by the rectifying circuit 40 and outputs the smoothed direct-current power to the switching unit 60.

The switching unit 60 adjusts currents flowing to two output terminals. The switching unit 60 and the smoothing inductor 50 are configured as a single-inductor multiple-output (SIMO) type circuit. The switching unit 60 includes two switching elements. The switching unit 60 includes, for example, an FET Q5 as a first switching element, and an FET Q6 as a second switching element. For example, the FETs Q5 and Q6 are N-channel type MOSFETs. The FET Q5 is provided between the smoothing inductor 50 and a first output terminal 71. The source terminal of the FET Q5 is coupled the other end of the smoothing inductor 50, and the drain terminal thereof is coupled to the first output terminal 71. The FET Q5, the gate terminal of which is coupled to the controller 80, is PWM-controlled by the controller 80. The FET Q5 adjusts a current output from the smoothing inductor 50 to the first output terminal 71.

The FET Q6 is provided between the smoothing inductor 50 and a second output terminal 72. The drain terminal of the FET Q6 is coupled the other end of the smoothing inductor 50, and the source terminal thereof is coupled to the second output terminal 72. The FET Q6 is coupled to the controller 80 and PWM-controlled by the controller 80. The FET Q6 adjusts a current output from the smoothing inductor 50 to the second output terminal 72.

The output unit 70 outputs direct-current power. The output unit 70 is coupled to the switching unit 60 and outputs the direct-current power output from the switching unit 60. The output unit 70 includes the first output terminal 71 and the second output terminal 72. The first output terminal 71 and the second output terminal 72 are different terminals. The first output terminal 71 is coupled to the drain terminal of the FET Q5 and outputs direct-current power output from the FET Q5. The second output terminal 72 is coupled to the source terminal of the FET Q6 and outputs direct-current power output from the FET Q6. In the present embodiment, the power output from the first output terminal 71 is greater than the power output from the second output terminal 72. Note that an output capacitor C2 is provided between the FET Q5 and the first output terminal 71 in parallel, and an output capacitor C3 is provided between the FET Q6 and the second output terminal 72 in parallel.

The controller 80 controls the full-bridge circuit 20 and the switching unit 60. The controller 80 includes an electronic circuit in which a well-known microcomputer is its core. Such a microcomputer includes a CPU, a ROM that configures a storage unit, a RAM, and an interface. The controller 80 PWM-controls the FETs Q1 to Q4 of the full-bridge circuit 20. As shown in FIG. 3, the controller 80 controls the FETs Q1 to Q4 by using pulse signals S1 to S4, respectively. The controller 80 feedback-controls the FETs Q1 to Q4 through digital signal processing (DSP). The controller 80 feedback-controls the full-bridge circuit 20 based on, for example, a first feedback-control amount corresponding to the difference between an output value output from the first output terminal 71 and a first target voltage to be targeted (first target value) Vref1 with the difference between an output value output from the second output terminal 72 and a second target voltage to be targeted (second target value) Vref2.

For example, the controller 80 determines the difference between a first output voltage Vo1, which is the voltage of the direct-current power output from the first output terminal 71, and the first target voltage Vref1. As shown in FIG. 2, the controller 80 subtracts the first output voltage Vo1 from the first target voltage Vref1 to determine the difference of the first output voltage Vo1 to the first target voltage Vref1. Here, the first target voltage Vref1, which is the voltage of power that a load unit coupled to the first output terminal 71 requires, is changed depending on the request of the load unit as necessary.

The controller 80 determines the difference between a second output voltage Vo2, which is the voltage of the direct-current-power output from the second output terminal 72, and the second target voltage Vref2. As shown in FIG. 2, the controller 80 subtracts the second output voltage Vo2 from the second target voltage Vref2 to determine the difference of the second output voltage Vo2 to the second target voltage Vref2. Here, the second target voltage Vref2, which is the voltage of power that a load unit coupled to the second output terminal 72 requires, is changed depending on the request of the load unit as necessary.

The controller 80 performs a PI operation on the total difference obtained by adding the difference of the first output voltage Vo1 and the difference of the second output voltage Vo2 to determine the first feedback-control amount. As shown in FIG. 3, the controller 80 determines the phase-shift amount Ph and the duty (time-ratio duty) for the respective pulse signals S1 to S4 to PWM-control the FETs Q1 to Q4, based on the first feedback-control amount. Here, the phase-shift amount Ph is the phase difference between the pulse signal S1 and the pulse signal S3, for example. The controller 80 PWM-controls the FET Q1 to Q4 based on the determined phase-shift amount Ph and duty.

The controller 80 feedback-controls the FETs Q5 and Q6 of the switching unit 60. For example, the controller 80 generates a rectangular pulse signal S6 based on the second feedback-control amount corresponding to the difference between the output value output from the second output terminal 72 and the second target voltage Vref2. As shown in FIG. 2, the controller 80 performs a PI operation on the difference of the second output voltage Vo1 described above to determine the second feedback-control amount, for example. The controller 80 determines the duty Du (see FIG. 3) of the pulse signal S6 to PWM-control the FET Q6, based on the second feedback-control amount. The controller 80 PWM-controls the FET Q6 based on the pulse signal S6 with the determined duty Du. The controller 80 controls the FET Q5 by using a pulse signal S5, which is obtained by reversing the pulse signal S6. Here, the pulse signal S6 and the pulse signal S5 are complementary pulse signals, so that when one pulse signal is on, the other pulse is off.

An operation example of the multi-output power supply device 1 will now be described. The controller 80 PWM-controls the FETs Q1 to Q4 of the full-bridge circuit 20 based on the respective pulse signals S1 to S4. As shown in FIG. 3, the full-bridge circuit 20 applies a voltage Vt to the primary winding of the transformer 30 from one side with the FETs Q2 and Q3 on, and applies the voltage Vt to the primary winding of the transformer 30 from the other side with the FETs Q1 and Q4 on. The transformer 30 steps down the alternating-current power output from the full-bridge circuit 20 and outputs the stepped-down, alternating-current power to the rectifying circuit 40. The rectifying circuit 40 rectifies the alternating-current power output from the transformer 30 to direct-current power and outputs the direct-current power to the smoothing inductor 50. The smoothing inductor 50 smoothes the direct-current power output from the rectifying circuit 40 and outputs the smoothed direct-current power to the switching unit 60. The switching unit 60 adjusts the current of the direct-current power output from the smoothing inductor 50. For example, the switching unit 60 adjusts a current I1 (see FIG. 3) output from the first output terminal 71 by turning on/off the FET Q5 based on the pulse signal S5. The switching unit 60 adjusts a current I2 output from the second output terminal 72 by turning on/off the FET Q6 based on the pulse signal S6. Note that a current IL shown in FIG. 3 is the current output from the smoothing inductor 50.

The controller 80 feedback-controls the FETs Q1 to Q4 by using the phase-shift amount Ph and the duty determined based on the first feedback-control amount. The controller 80 feedback-controls the FETs Q5 and Q6 by using the duty Du determined based on the second feedback-control amount.

As above, the multi-output power supply device 1 according to the first embodiment includes the insulated transformer 30, the rectifying circuit 40, the smoothing inductor 50, the first output terminal 71, the second output terminal 72, the FET Q5, the FET Q6, and the controller 80. The insulated transformer 30 transforms the voltage of alternating-current power. The rectifying circuit 40 rectifies the alternating-current power transformed by the transformer 30 to the direct-current power. The smoothing inductor 50 smoothes the direct-current power rectified by the rectifying circuit 40. The first output terminal 71 outputs the direct-current power smoothed by the smoothing inductor 50. The second output terminal 72 is a terminal different from the first output terminal 71 and outputs the direct-current power smoothed by the smoothing inductor 50. The FET Q5 is provided between the smoothing inductor 50 and the first output terminal 71 and adjusts the current output from the smoothing inductor 50 to the first output terminal 71. The FET Q6 is provided between the smoothing inductor 50 and the second output terminal 72 and adjusts the current output from the smoothing inductor 50 to the second output terminal 72. The controller 80 controls the FET Q5 and the FET Q6.

This configuration enables the multi-output power supply device 1 to be configured as a multi-output power supply device with the insulated transformer 30 and the single-inductor multi-output (SIMO) type circuit. The multi-output power supply device 1 thus can output power with the different voltages from the first and second output terminals 71 and 72, so that a plurality of power supplies can be properly configured from the high-voltage power supply 10.

The conventional multi-output power supply device may be configured as, for example, a multi-output power supply device with an insulated DC/DC converter and a step-down chopper circuit. In contrast, the multi-output power supply device 1 according to the present invention is configured as the multi-output power supply device with the insulated full-bridge circuit 20 and the single-inductor multi-output (SIMO) type circuit. This configuration of the multi-output power supply device 1 according to the present invention can decrease an inductor and a diode while increasing switching elements in comparison with the conventional multi-output power supply device. In the multi-output power supply device 1 according to the present invention, this enables an inductor that is relatively large in size to be decreased, so that upsizing of the device can be prevented. Furthermore, the production cost of the multi-output power supply device 1 can be reduced.

The multi-output power supply device 1 described above includes the full-bridge circuit 20. This circuit outputs, to the transformer 30, the alternating-current power obtained by transforming the direct-current power supplied from the power supply 10. The controller 80 controls the full-bridge circuit 20 based on the first feedback-control amount corresponding to the difference between the output value output from the first output terminal 71 and the first target voltage Vref1 to be targeted with the difference between the output value output from the second output terminal 72 and the second target voltage Vref2 to be targeted. This configuration allows the multi-output power supply device 1 to determine the first feedback-control amount in consideration of the differences of the respective output values that are output from the first output terminal 71 and the second output terminal 72, so that the power output from the full-bridge circuit 20 can approach the target value in comparison with a case where the first feedback-control amount is determined based on the difference of the output value output from the one-side output terminal.

In the multi-output power supply device 1 described above, the controller 80 controls the FET Q6 by using the rectangular pulse signal S6 generated based on the second feedback-control amount corresponding to the difference between the output value output from the second output terminal 72 and the second target voltage Vref2 to be targeted, and controls the FET Q5 by using the pulse signal S5 obtained by reversing the pulse signal S6. This configuration enables the multi-output power supply device 1 to control the FETs Q5 and Q6 by using the complementary pulse signals to feedback-control them based on the second feedback-control amount corresponding to the difference of the output value output from the one-side output terminal. This simplifies the feedback control of the FETs Q5 and Q6 in the multi-output power supply device 1.

Variation of First Embodiment

Figure 4:
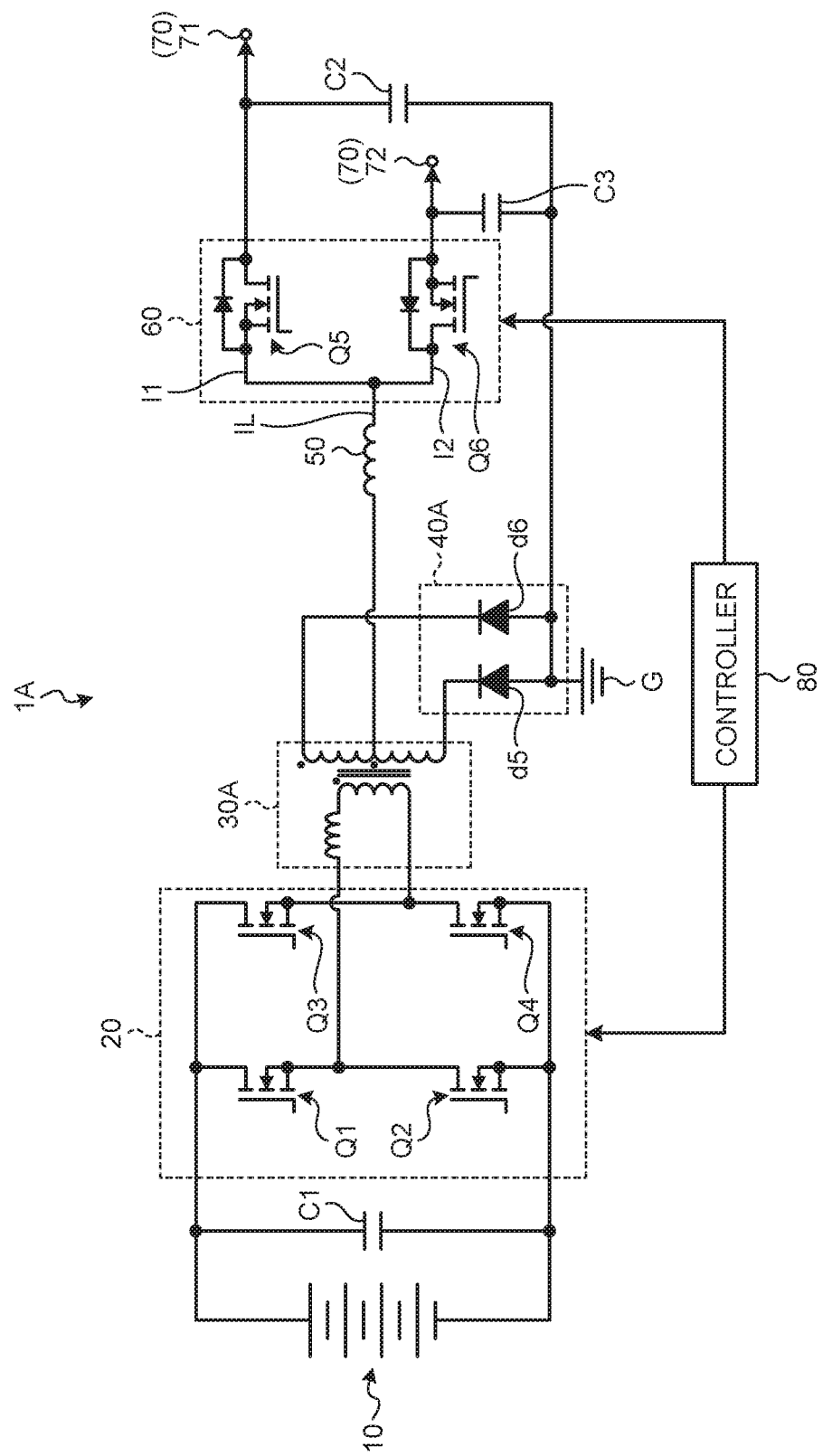
FIG. 4 is a circuit diagram illustrating a configuration example of a multi-output power supply device according to a variation of the first embodiment.

A variation of the first embodiment will now be described. FIG. 4 is a circuit diagram illustrating a configuration example of a multi-output power supply device 1A according to the variation of the first embodiment. The multi-output power supply device 1A is different from the multi-output power supply device 1 of the first embodiment in that this device includes a center-tap-type transformer 30A and a rectifying circuit 40A as shown in FIG. 4. The rectifying circuit 40A has diodes d5 and d6. At the transformer 30A, the center tap of a secondary winding is coupled to the smoothing inductor 50, one end of the secondary winding is coupled to the cathode terminal of the diode d6 of the rectifying circuit 40A, and the other end of the secondary winding is coupled to the cathode terminal of the diode d5 of the rectifying circuit 40A. Each anode terminal of the diodes d5 and d6 is coupled to the grand G.

The transformer 30A steps down the alternating-current power output from the full-bridge circuit 20 and outputs the stepped-down, alternating-current power to the rectifying circuit 40A. The rectifying circuit 40A rectifies the alternating-current power output from the transformer 30A to direct-current power and outputs the direct-current power to the smoothing inductor 50. The smoothing inductor 50 smoothes the direct-current power output from the rectifying circuit 40A and outputs the smoothed direct-current power to the switching unit 60. The switching unit 60 adjusts the current of the direct-current power output from the smoothing inductor 50. In this way, the multi-output power supply device 1A may adopt the center-tap-type transformer 30A.

Second Embodiment

Figure 5:
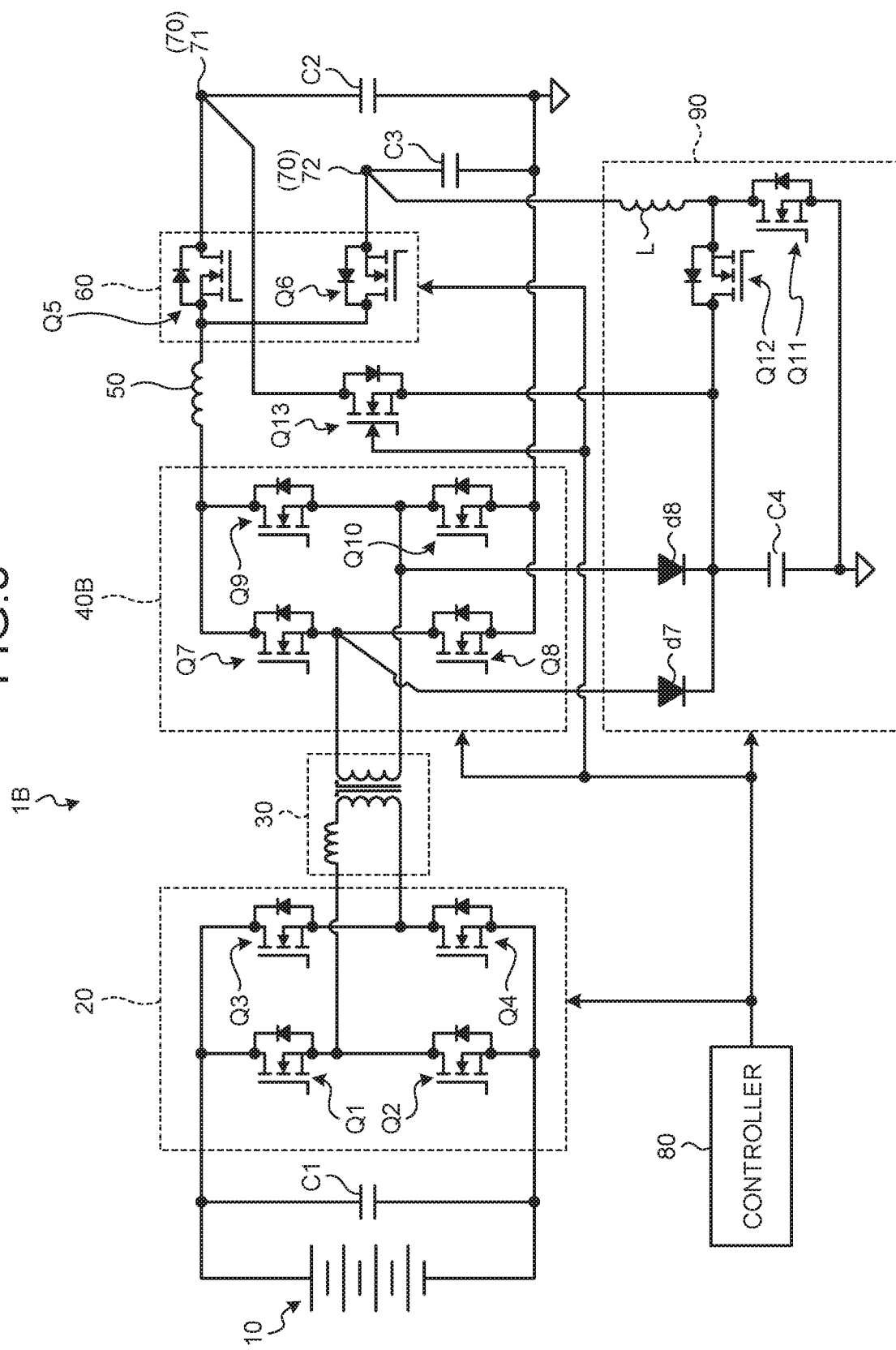
FIG. 5 is a circuit diagram illustrating a configuration example of a multi-output power supply device according to a second embodiment.
Figure 6:
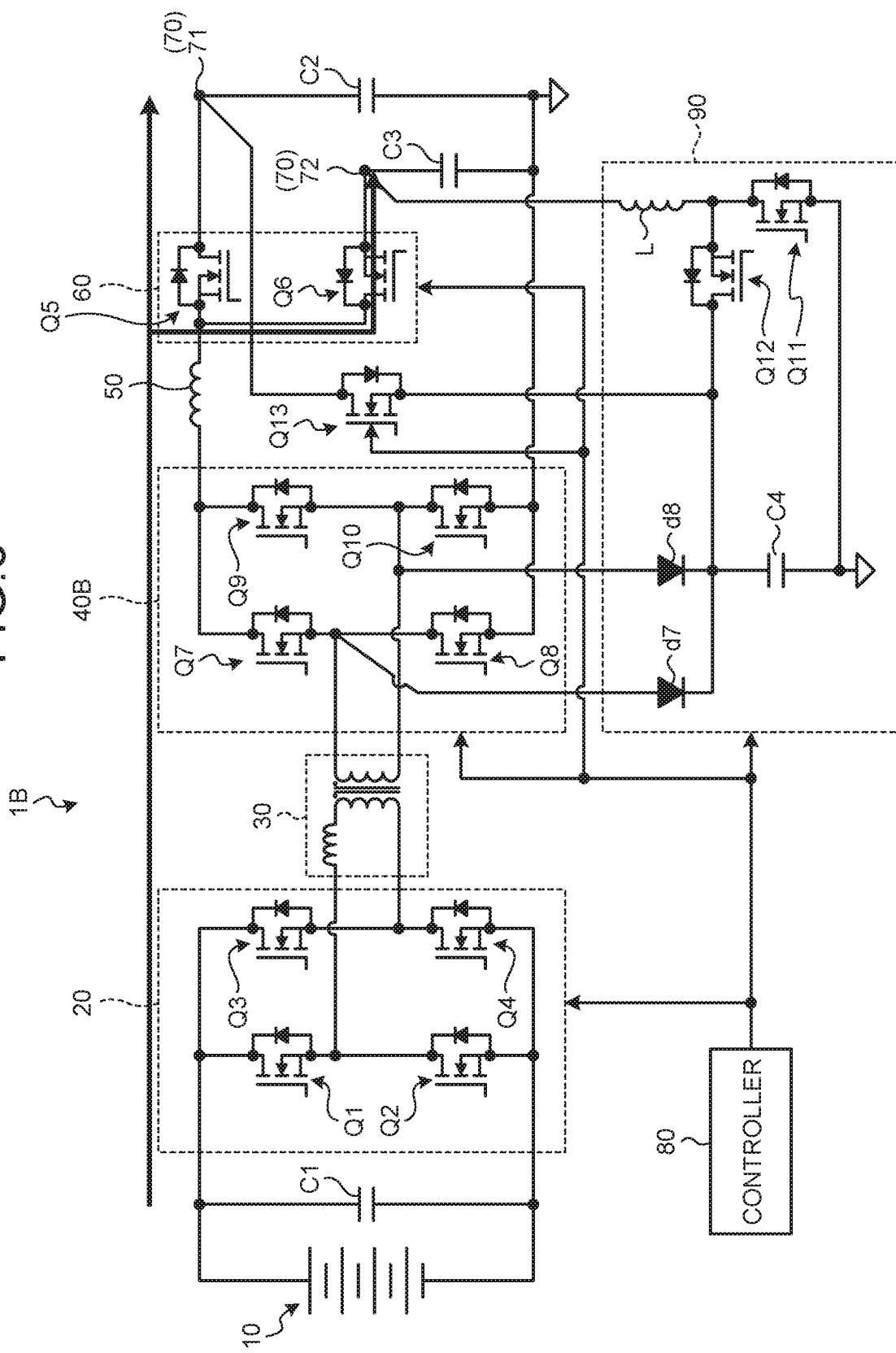
FIG. 6 is a circuit diagram illustrating a first operation example of the multi-output power supply device according to the second embodiment.
Figure 7:
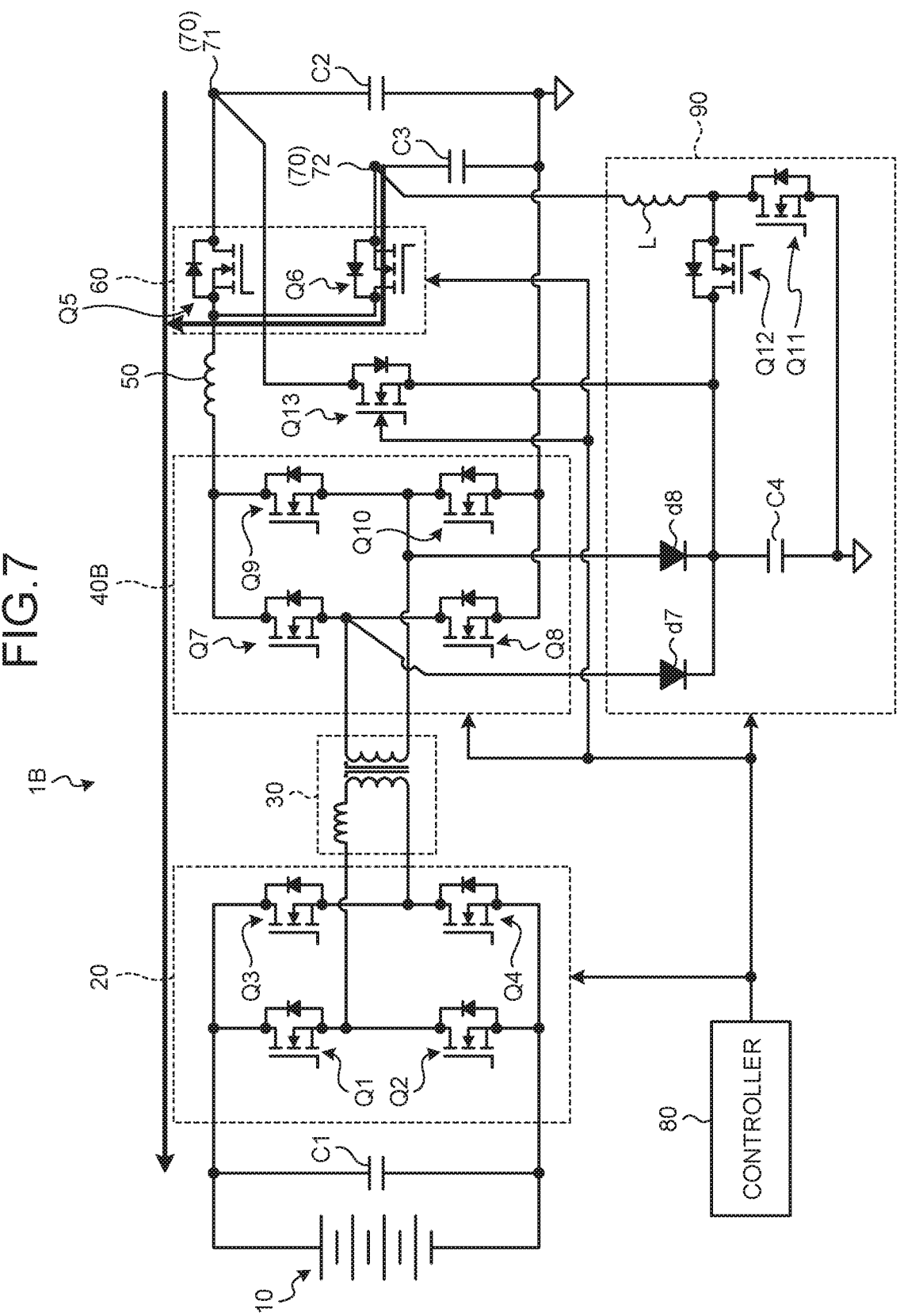
FIG. 7 is a circuit diagram illustrating a second operation example of the multi-output power supply device according to the second embodiment.
Figure 8:
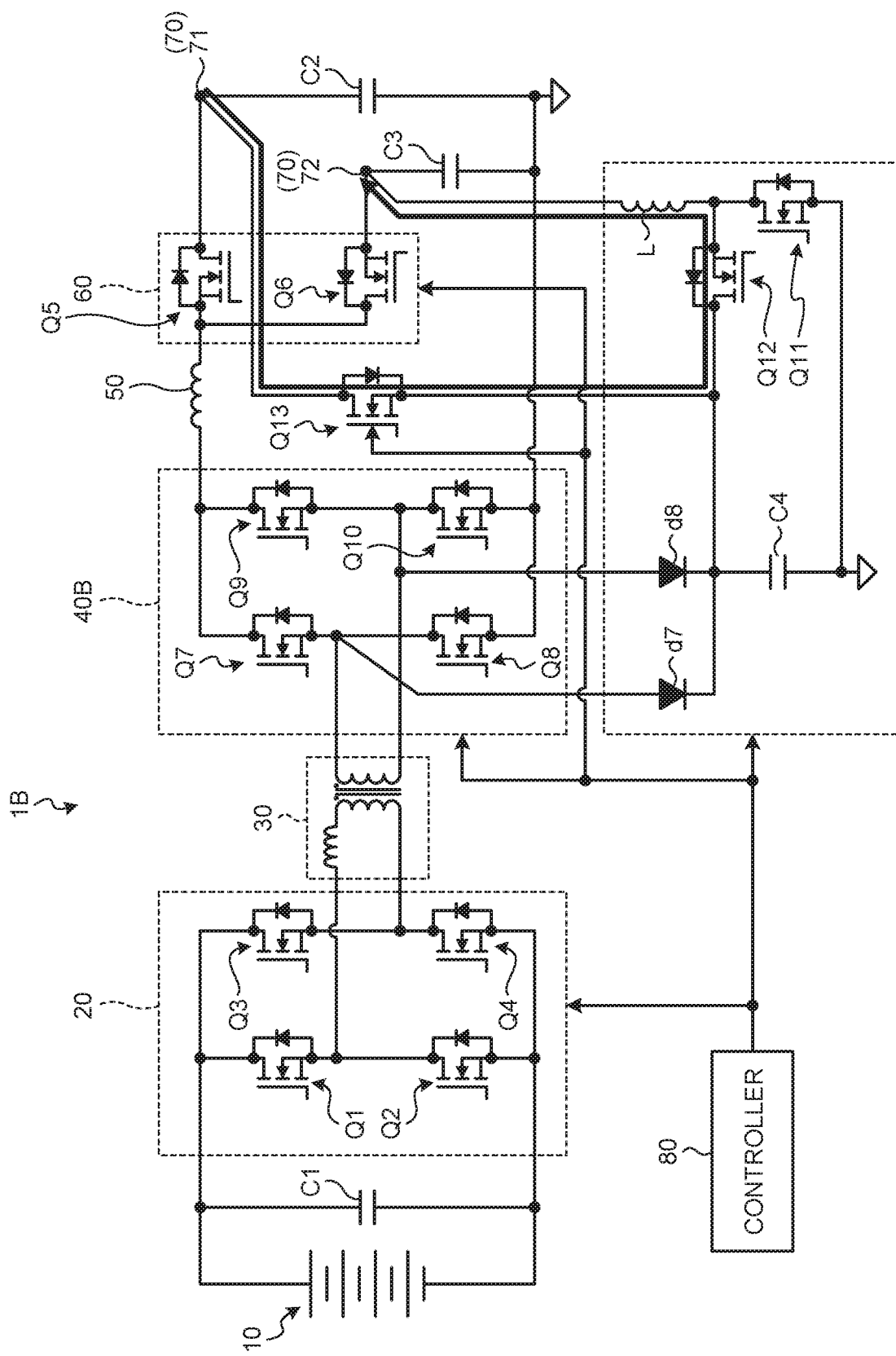
FIG. 8 is a circuit diagram illustrating a third operation example of the multi-output power supply device according to the second embodiment.
Figure 9:
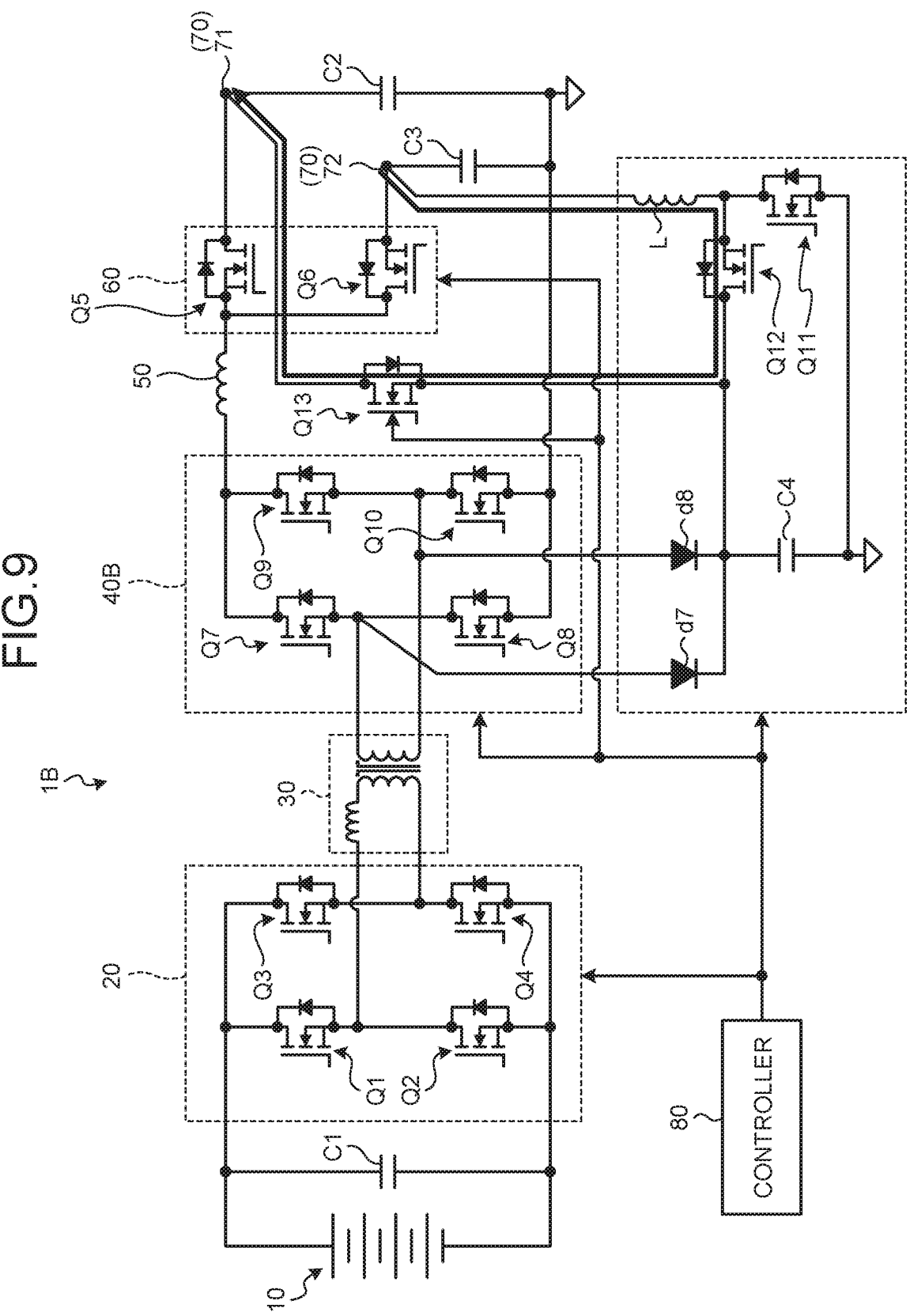
FIG. 9 is a circuit diagram illustrating a fourth operation example of the multi-output power supply device according to the second embodiment.

A multi-output power supply device 1B according to a second embodiment will now be described. FIG. 5 is a circuit diagram illustrating a configuration example of the multi-output power supply device 1B according to the second embodiment. FIG. 6 is a circuit diagram illustrating a first operation example of the multi-output power supply device 1B according to the second embodiment. FIG. 7 is a circuit diagram illustrating a second operation example of the multi-output power supply device 1B according to the second embodiment. FIG. 8 is a circuit diagram illustrating a third operation example of the multi-output power supply device 1B according to the second embodiment. FIG. 9 is a circuit diagram illustrating a fourth operation example of the multi-output power supply device 1B according to the second embodiment.

The multi-output power supply device 1B according to the second embodiment is different from the multi-output power supply device 1 according to the first embodiment in that this device includes a snubber circuit 90 and an FET Q13 as a fourth switching element. The snubber circuit 90 is a circuit that suppresses a surge component (surge power) of power. The snubber circuit 90 includes diodes d7 and d8, a snubber capacitor C4 as a storage element, an FET Q11, an FET Q12 as a third switching element, and snubber inductor L for smoothing. The snubber circuit 90 storages, in the snubber capacitor C4, surge power output due to reverse recovery time of parasitic diodes in FETs Q7 to Q10 of the full-bridge circuit (rectifying circuit) 40B on the secondary side to suppress the surge component at the output. Note that, for example, the FETs Q7 to Q10 are N-channel type MOSFETs. The snubber capacitor C4, which is a capacitor that storages power, is coupled to one end side of the secondary winding of the transformer 30 via the diode d7. Furthermore, the snubber capacitor C4 is coupled to the other end side of the secondary winding of the transformer 30 via the diode d8.

The FET Q11 is provided between the negative-side terminal of the snubber capacitor C and the second output terminal 72. The FET Q11 is an N-channel type MOSFET. The source terminal thereof is coupled to the negative-side terminal of the snubber capacitor C, and the drain terminal thereof is coupled to the second output terminal 72 via the snubber inductor L. The FET Q11 is turned off by the controller 80 when outputting the surge power stored in the snubber capacitor C to the second output terminal 72. The FET Q11 is turned on by the controller 80 when storing the surge power in the snubber capacitor C.

The FET Q12 discharges the surge power stored in the snubber capacitor C to the second output terminal 72. The FET Q12 is provided between the snubber capacitor C and the second output terminal 72. The FET Q12 is an N-channel type MOSFET. The drain terminal thereof is coupled to the positive-side terminal of the snubber capacitor C, and the source terminal thereof is coupled to the second output terminal 72 via the snubber inductor L. The FET Q12 is turned on by the controller 80 and outputs the surge power stored in the snubber capacitor C to the second output terminal 72 to regenerate the power. The FET Q12 is turned off by the controller 80 and stores the surge power in the snubber capacitor C.

The snubber inductor L configures a snubber smoothing circuit, along with an output capacitor C3. The snubber inductor L is provided between the FET Q12 and the second output terminal 72. One end of the snubber inductor L is coupled to the source terminal of the FET Q12, and the other end thereof is coupled to the second output terminal 72. The snubber smoothing circuit smoothes the power supplied from the snubber capacitor C to output it to the second output terminal 72.

The FET Q13 energizes or de-energizes a current flowing between the first output terminal 71 and the second output terminal 72. The FET Q13 is provided between the first output terminal 71 and the FET Q12. The FET Q13 is an N-channel type MOSFET. The drain terminal thereof is coupled to the first output terminal 71, and the source terminal thereof is coupled to the drain terminal of the FET Q12. The FET Q13 is turned on by the controller 80 and energizes between the first output terminal 71 and the second output terminal 72. The FET Q13 is turned off by the controller 80 and de-energizes between the first output terminal 71 and the second output terminal 72.

The snubber inductor L, the FET Q12, and the FET Q13 configure a step-down chopper circuit. The step-down chopper circuit turns on the FET Q13 and switching-controls the FET Q12 to step down the voltage of power supplied from a battery coupled to the first output terminal 71 to output it to a battery coupled to the second output terminal 72. The snubber inductor L, the FET Q12, and the FET Q13 configure a step-up chopper circuit. For example, the step-up chopper circuit turns on the FET Q13 and switching-controls the FET Q12 to step up the voltage of power supplied from a battery coupled to the second output terminal 72 to output it to the battery coupled to the first output terminal 71.

An operation example of the multi-output power supply device 1B will now be described. As shown in FIG. 6, the multi-output power supply device 1B supplies power from the primary side to the secondary side and supplies power to the respective batteries that are coupled to the first output terminal 71 and the second output terminal 72. At this time, the snubber circuit 90 outputs the surge power output due to the reverse recovery time of the full-bridge circuit 40B on the secondary side to the second output terminal 72 as regeneration power.

As shown in FIG. 7, the multi-output power supply device 1B supplies power from the secondary side to the primary side and supplies power to the power supply 10 on the primary side. At this time, the snubber circuit 90 outputs the surge power output due to the reverse recovery time of the full-bridge circuit 40B on the secondary side to the second output terminal 72 as the regeneration power.

As shown in FIG. 8, the multi-output power supply device 1B steps down the voltage of the power supplied from the battery coupled to the first output terminal 71 to output it to the battery coupled to the second output terminal 72, by using the step-down chopper circuit described above. At this time, the multi-output power supply device 1B supplies no power from the primary side to the secondary side and thus generates no surge power, which is output due to the reverse recovery time of the full-bridge circuit 40B on the secondary side. This allows the snubber circuit 90 of the multi-output power supply device 1B to be disabled, so that parts of the snubber circuit 90 (the snubber inductor L and the FET Q12) can be also used as components of the step-down chopper circuit.

As shown in FIG. 9, the multi-output power supply device 1B steps up the voltage of the power supplied from the battery coupled to the second output terminal 72 to output it to the battery coupled to the first output terminal 71, by using the step-up chopper circuit described above. At this time, the multi-output power supply device 1B supplies no power from the primary side to the secondary side and thus generates no surge power, which is output due to the reverse recovery time of the full-bridge circuit 40B on the secondary side. This allows the snubber circuit 90 of the multi-output power supply device 1B to be disabled, so that parts of the snubber circuit 90 (the snubber inductor L and the FET Q12) can be also used as components of the step-up chopper circuit.

As above, the multi-output power supply device 1B according to the second embodiment includes the snubber circuit 90 and the FET Q13. The snubber circuit 90 includes the snubber capacitor C4, the FET Q12, and the snubber inductor L. The snubber capacitor C4 stores the surge power due to the reverse recovery time of the full-bridge circuit 40B. The FET Q12 discharges the surge power stored in the snubber capacitor C4. The snubber inductor L is provided between the FET Q12 and the second output terminal 72. The FET Q13 is provided between the first output terminal 71 and the FET Q12, and energizes or de-energizes the current flowing between the first output terminal 71 and the second output terminal 72. The snubber inductor L, the FET Q12, and the FET Q13 configure the step-down chopper circuit and the step-up chopper circuit. The step-down chopper circuit steps down the voltage of the power supplied from the first output terminal 71 to output it to the second output terminal 72. The step-up chopper circuit steps up the voltage of the power supplied from the second output terminal 72 to output it to the first output terminal 71.

This configuration of the multi-output power supply device 1B enables parts of the snubber circuit 90 (the snubber inductor L and the FET Q12) to be also used as components of the step-down chopper circuit and the step-up chopper circuit. This can prevent upsizing of the multi-output power supply device 1B and reduce the production cost thereof. The multi-output power supply device 1B can also perform power conversion between the first output terminal 71 and the second output terminal 72. This can increase power-conversion patterns and provide power supply devices with high marketability.

Note that the above description has discussed the example in which the controller 80 performs the PI operation on the total difference obtained by adding the difference of the first output voltage Vo1 and the difference of the second output voltage Vo2, but without being limited to this, other operation methods such as a PID operation may be applied.

The example in which the controller 80 controls the FET Q6 by using the rectangular pulse signal S6 generated based on the second feedback-control amount corresponding to the difference between the output value output from the second output terminal 72 and the second target voltage Vref2 and controls the FET Q5 by using the pulse signal S5 obtained by reversing the pulse signal S6 has been discussed, but is not limited to this. For example, the controller 80 may control the FET Q5 by using the rectangular pulse signal S5 generated based on the second feedback-control amount corresponding to the difference between the output value output from the first output terminal 71 and the first target voltage Vref1 and control the FET Q6 by using the pulse signal S6 obtained by reversing the pulse signal S5.

The example in which the controller 80 feedback-controls the FETs Q1 to Q4 by using the DSP has been discussed, but without being limited to this, an analog circuit may feedback-control the FETs Q1 to Q4.

The example in which the FETs Q1 to Q13 are N-channel type MOSFETs has been discussed, but without being limited to this, they may be other switching elements such as insulated gate bipolar transistors (IGBTs).

The multi-output power supply device 1B according to the second embodiment may be configured with a center-tap-type transformer.

The power supply device according to the embodiment can be configured as a multi-output power supply device with the insulated transformer and the single-inductor multiple-output (SIMO) type circuit, so that the power supplies can be properly configured from the high-voltage power supply.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
an insulated transformer that transforms a voltage of alternating-current power;
a rectifying circuit that rectifies the alternating-current power transformed by the transformer to direct-current power;
a smoothing inductor that smoothes the direct-current power rectified by the rectifying circuit;
a first output terminal that outputs the direct-current power smoothed by the smoothing inductor;
a second output terminal that is a terminal different from the first output terminal and outputs the direct-current power smoothed by the smoothing inductor;
a first switching element that is provided between the smoothing inductor and the first output terminal and adjusts a current output from the smoothing inductor to the first output terminal;
a second switching element that is provided between the smoothing inductor and the second output terminal and adjusts a current output from the smoothing inductor to the second output terminal;
a controller that controls the first switching element and the second switching element; and
a switching circuit that outputs, to the transformer, alternating-current power obtained by transforming direct-current power supplied from a power supply, wherein
the controller controls the switching circuit based on a first feedback-control amount corresponding to a difference between an output value output from the first output terminal and a first target voltage to be targeted with a difference between an output value output from the second output terminal and a second target voltage to be targeted.

2. The power supply device according to claim 1, wherein the controller controls the first switching element by using a rectangular first pulse signal generated based on a second feedback-control amount corresponding to a difference between an output value output from any one of the first output terminal and the second output terminal and a target value to be targeted, and controls the second switching element by using a second pulse signal obtained by reversing the first pulse signal.

3. The power supply device according to claim 2, comprising:
- a snubber circuit that includes a storage element storing surge power due to reverse recovery time of the rectifying circuit, a third switching element discharging the surge power stored in the storage element, and a snubber inductor provided between the third switching element and the second output terminal; and
- a fourth switching element that is provided between the first output terminal and the third switching element and energizes or de-energizes a current flowing between the first output terminal and the third switching element, wherein
- the snubber inductor, the third switching element, and the fourth switching element configures a step-down chopper circuit that steps down a voltage of power supplied from the first output terminal to output the stepped-down voltage to the second output terminal, and a step-up chopper circuit that steps up a voltage of power supplied from the second output terminal to output the stepped-up voltage to the first output terminal.

4. The power supply device according to claim 1, further comprising:
- a snubber circuit that includes a storage element storing surge power due to reverse recovery time of the rectifying circuit, a third switching element discharging the surge power stored in the storage element, and a snubber inductor provided between the third switching element and the second output terminal; and
- a fourth switching element that is provided between the first output terminal and the third switching element and energizes or de-energizes a current flowing between the first output terminal and the third switching element, wherein
- the snubber inductor, the third switching element, and the fourth switching element configures a step-down chopper circuit that steps down a voltage of power supplied from the first output terminal to output the stepped-down voltage to the second output terminal, and a step-up chopper circuit that steps up a voltage of power supplied from the second output terminal to output the stepped-up voltage to the first output terminal.

5. A power supply device comprising:
- an insulated transformer that transforms a voltage of alternating-current power;
- a rectifying circuit that rectifies the alternating-current power transformed by the transformer to direct-current power;
- a smoothing inductor that smoothes the direct-current power rectified by the rectifying circuit;
- a first output terminal that outputs the direct-current power smoothed by the smoothing inductor;
- a second output terminal that is a terminal different from the first output terminal and outputs the direct-current power smoothed by the smoothing inductor;
- a first switching element that is provided between the smoothing inductor and the first output terminal and adjusts a current output from the smoothing inductor to the first output terminal;
- a second switching element that is provided between the smoothing inductor and the second output terminal and adjusts a current output from the smoothing inductor to the second output terminal; and
- a controller that controls the first switching element and the second switching element, wherein
- the controller controls the first switching element by using a rectangular first pulse signal generated based on a second feedback-control amount corresponding to a difference between an output value output from any one of the first output terminal and the second output terminal and a target value to be targeted, and controls the second switching element by using a second pulse signal obtained by reversing the first pulse signal.

6. A power supply device comprising:
- an insulated transformer that transforms a voltage of alternating-current power;
- a rectifying circuit that rectifies the alternating-current power transformed by the transformer to direct-current power;
- a smoothing inductor that smoothes the direct-current power rectified by the rectifying circuit;
- a first output terminal that outputs the direct-current power smoothed by the smoothing inductor;
- a second output terminal that is a terminal different from the first output terminal and outputs the direct-current power smoothed by the smoothing inductor;
- a first switching element that is provided between the smoothing inductor and the first output terminal and adjusts a current output from the smoothing inductor to the first output terminal;
- a second switching element that is provided between the smoothing inductor and the second output terminal and adjusts a current output from the smoothing inductor to the second output terminal;
- a controller that controls the first switching element and the second switching element;
- a snubber circuit that includes a storage element storing surge power due to reverse recovery time of the rectifying circuit, a third switching element discharging the surge power stored in the storage element, and a snubber inductor provided between the third switching element and the second output terminal; and
- a fourth switching element that is provided between the first output terminal and the third switching element and energizes or de-energizes a current flowing between the first output terminal and the third switching element, wherein
- the snubber inductor, the third switching element, and the fourth switching element configures a step-down chopper circuit that steps down a voltage of power supplied from the first output terminal to output the stepped-down voltage to the second output terminal, and a step-up chopper circuit that steps up a voltage of power supplied from the second output terminal to output the stepped-up voltage to the first output terminal.

* * * * *